United States Patent [19]

Federico et al.

[11] Patent Number: 4,852,260

[45] Date of Patent: Aug. 1, 1989

[54] SIDEWALK EDGING DEVICE

[75] Inventors: Joseph W. Federico; Daniel J. Whittenberger, both of Clearwater, Fla.

[73] Assignee: Luis A. Herrero, Clearwater, Fla.

[21] Appl. No.: 185,003

[22] Filed: Apr. 22, 1988

[51] Int. Cl.$^4$ .............................................. B26B 21/00
[52] U.S. Cl. ...................................... 30/292; 30/314; 30/319; 172/13
[58] Field of Search ................ 30/292, 293, 306, 319, 30/314; 172/13, 15, 17

[56] References Cited

U.S. PATENT DOCUMENTS

| | | | |
|---|---|---|---|
| 2,506,366 | 5/1950 | Korn | 30/292 |
| 2,560,882 | 7/1951 | McCauley | 30/292 X |
| 2,900,723 | 8/1959 | Hamilton et al. | 30/292 |
| 4,459,747 | 7/1984 | Salem et al. | 30/292 X |

Primary Examiner—Frank T. Yost
Assistant Examiner—Willmon Fridie, Jr.
Attorney, Agent, or Firm—Ronald E. Smith; Joseph C. Mason, Jr.

[57] ABSTRACT

A tractor-towable sidewalk edging device includes a pair of laterally spaced cutting blade members and the depth of the cut the blade members make in vegetation to be trimmed is controllable by adding or removing weight members to receptacle members which form a part of the device. The lateral spacing between the cutting blade members is adjustable in three different ways. Each cutting blade member may also be pivoted about a vertical axis.

15 Claims, 3 Drawing Sheets

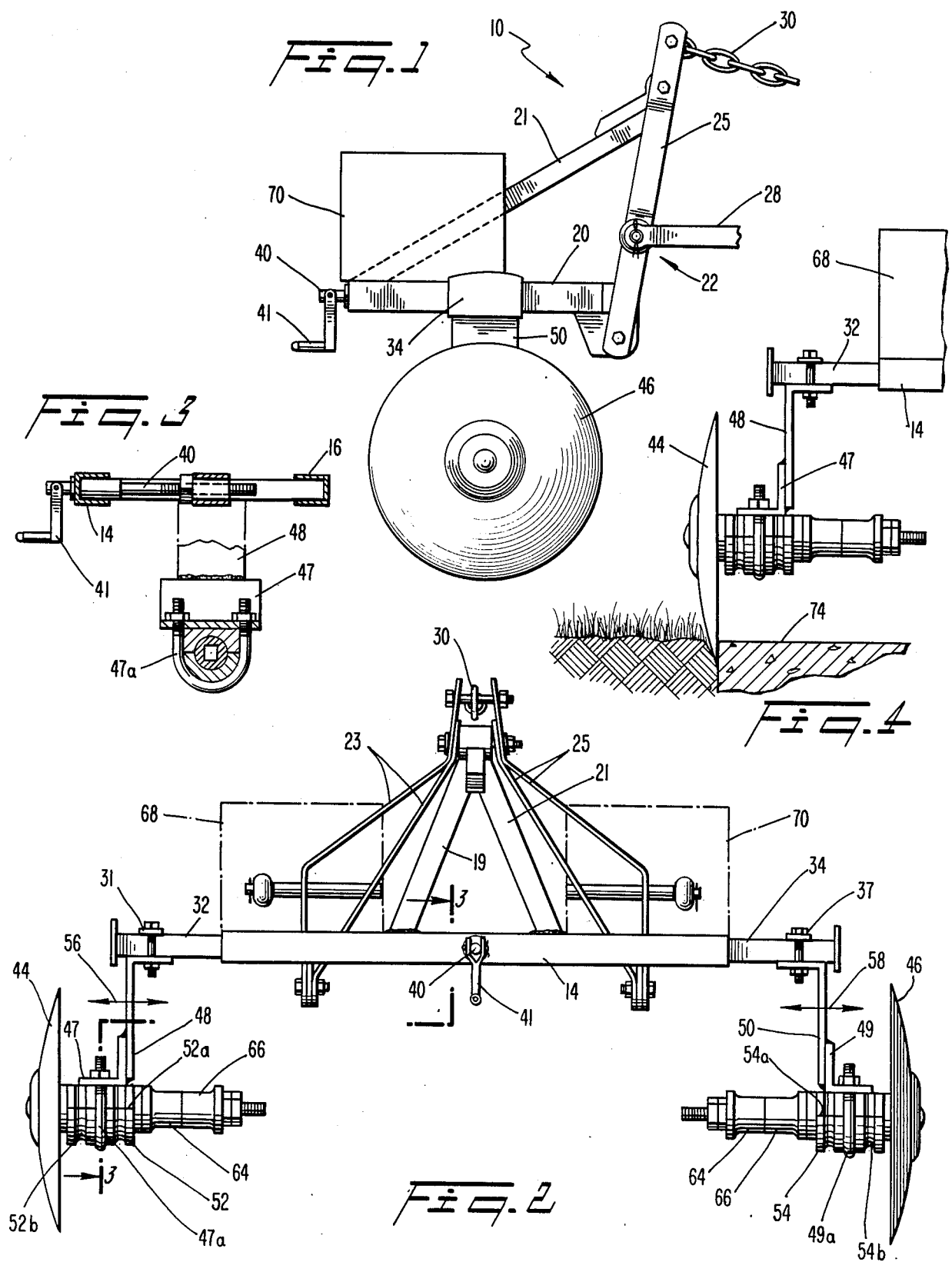

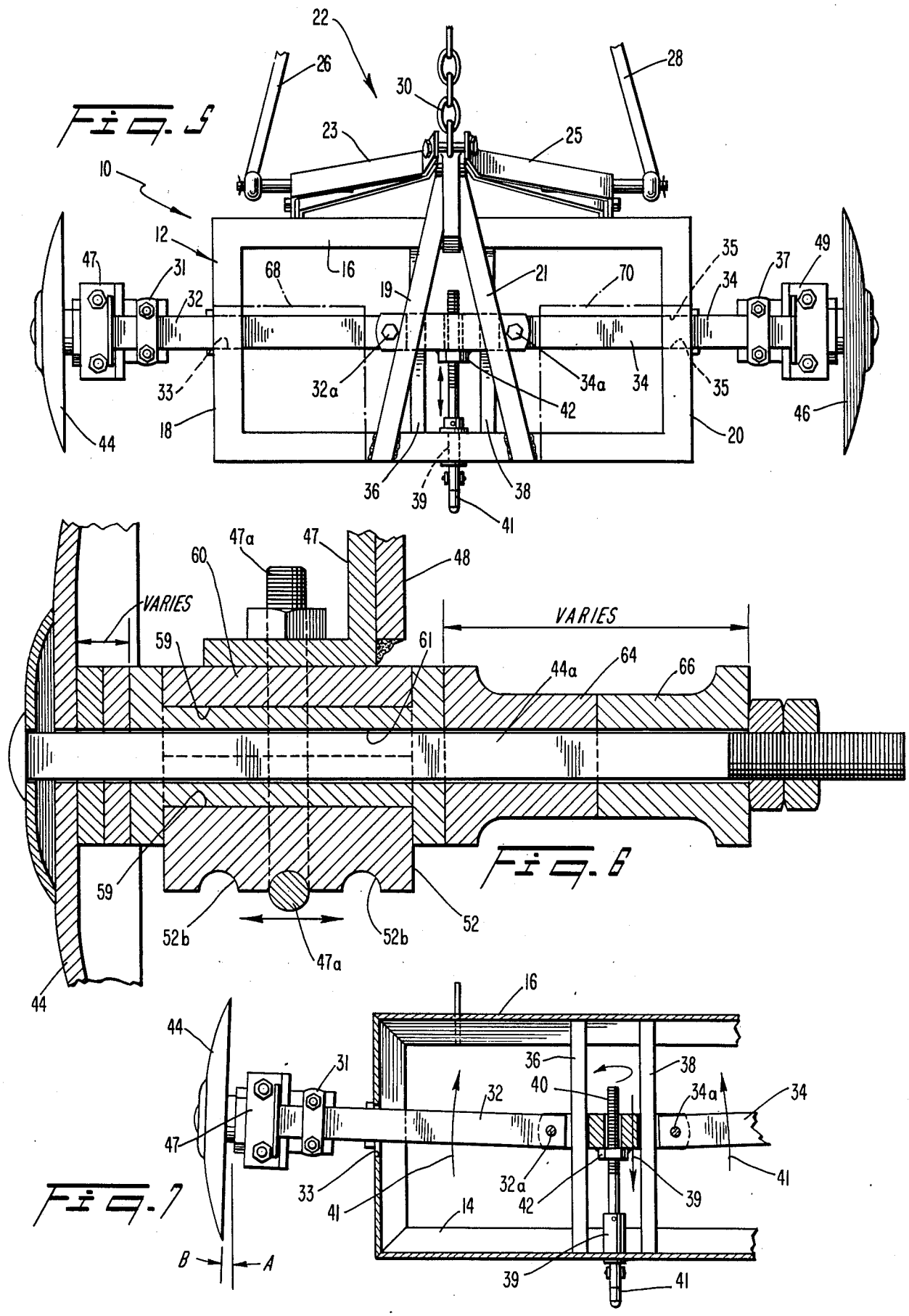

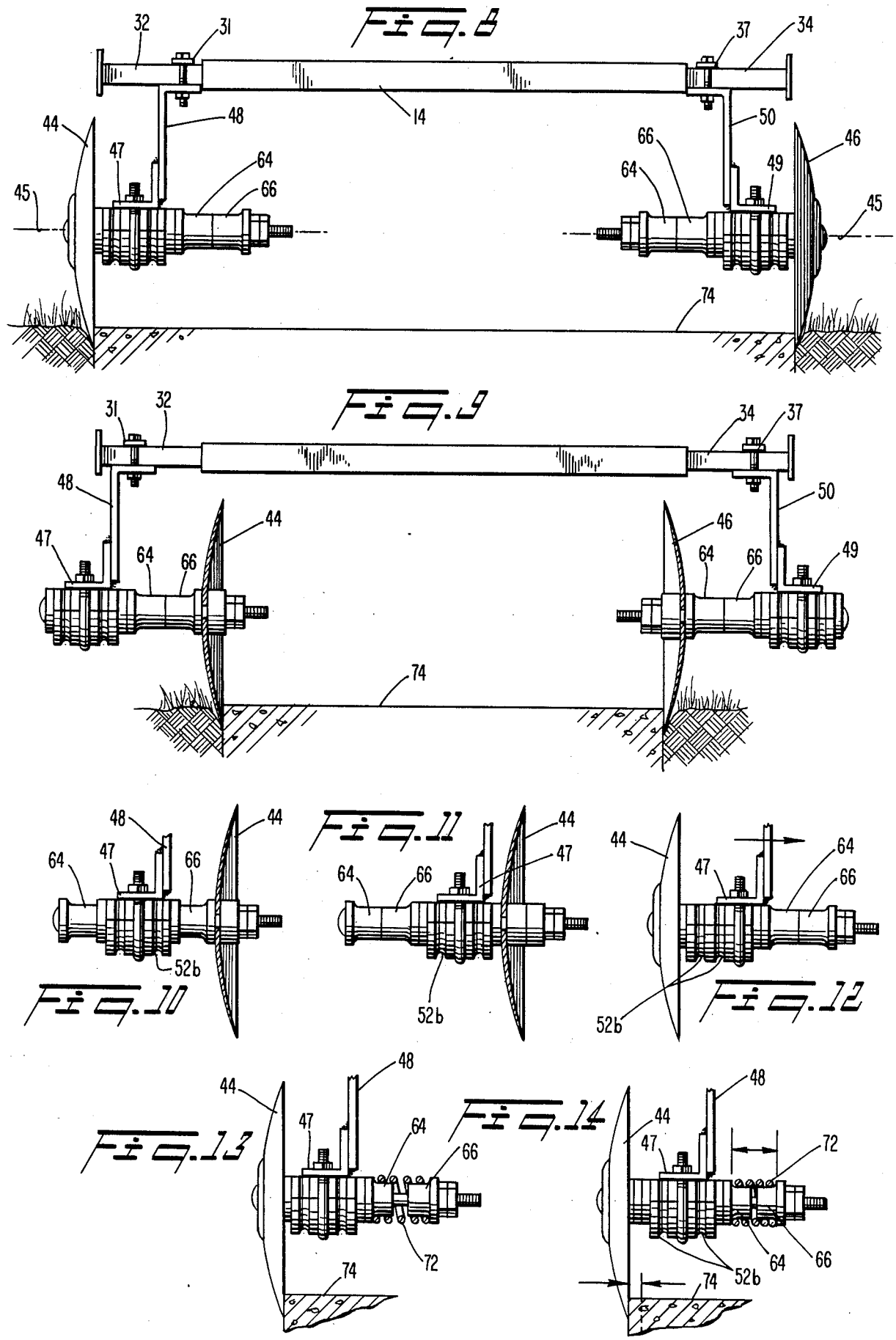

SIDEWALK EDGING DEVICE

BACKGROUND OF THE INVENTION

1. Field of the Invention.

This invention relates, generally, to sidewalk edging devices having laterally adjustable cutting blade members; more specifically, it relates to an edging device having means for adjusting the depth of the cut made by the laterally adjustable cutting blades.

2. Description of the Prior Art.

A sidewalk built in a grassy area will be gradually overgrown if the grass contiguous to the walk is not periodically trimmed. Wind and rain gradually shift soil and grass seeds over the edges of the walk and in a few growing seasons, a completely neglected walkway can become completely overgrown.

Accordingly, the edges of a well-maintained sidewalk are frequently trimmed. The trimming, most often referred to as edging, may be accomplished in numerous ways. The grass can be pulled by hand, cut with a hand-held trimmer, treated with grass killing chemicals, and the like, but these methods are time-consuming and impractical where substantial lengths of walkways must be maintained by just a few people.

A tool used by many individuals includes a small blade that rotates in a vertical plane; the blade is fixedly secured to the horizontally disposed output shaft of a motor. The rotating blade effectively trims the edges of the sidewalk, but the operator of the device must slowly and carefully guide the rotating blade down the extent of the walkway. Careless operation results in the rotating blade hitting and chipping the sidewalk.

Even these motor-operated edgers are inadequate to maintain miles of sidewalks. Accordingly, many municipalities use tractor-drawn edging devices that include a rotatably mounted disk-like blade member that simply rolls along the edge of the sidewalk and abrades vegetation growing thereover.

Although such devices are effective, they require two trips down the sidewalk, one pass for each edge thereof.

Examples of patents which show sidewalk edging devices and devices which could possibly be adapted to function as edgers are: U.S. Pat. Nos. 2,464,695; 3,093,196; 1,883,409; 4,404,918; 3,757,500 and U.K. Patent No. 2,119,213.

Some of these devices, again, could possibly be adapted to perform the function of walkway edging. However, many of them lack practical means for adjusting the distance between the blades.

Since sidewalk widths may vary, even within the same city, the ability of a device to adjust quickly to differing sidewalk widths is a most important feature. Although some prior art devices have some lateral adjustment capabilities, as aforesaid, the art of sidewalk edgers having easily adjustable blades has not heretofore reached its full fruition.

The devices of the prior art have still another important limitation; importantly, virtually no attempts have been made to overcome such limitation. The present inventors, therefore, are the first to even recognize the problem; their solution to the problem is thus a pioneering breakthrough in the art of dual-bladed sidewalk edging devices.

The present inventors have observed that the prior art devices do not take into consideration the fact that the condition of the soil and vegetation abutting the walk to be trimmed have a substantial impact on the edging procedure. Soft soil, for example, will abrade easily when trimmed with rolling disk members, whereas hard, dry soil will not. Moreover, vegetation that has been allowed to grow for substantial periods of time will offer substantially more resistance to the cutting blade.

Thus, a device which adequately performs its intended function when the soil is moist and reasonably soft and when the vegetation has not been allowed to grow for long periods of time may fail when the soil is dry and hard and when the vegetation has been allowed to grow, if the cutting blade members lack sufficient weight.

Nor is it acceptable to simply provide very heavy cutting blades, because such blades will sink too deeply into the soil when it is soft or when the vegetation is not established, thereby causing the tractor or other towing vehicle to use excessive amounts of fuel. Light blades should be used in soft soil or light vegetation to conserve fuel. However, light blades will simply roll over hard soil and thick vegetation and fail to adequately abrade the same.

One solution to the problem that has been perceived by the present inventors would simply be to maintain a supply of cutting blade members of differing weights and to change the blades to match the encountered soil and vegetation conditions.

However, that solution is cumbersome, time-consuming and inelegant.

The art neither teaches nor suggests a more acceptable solution to the problem of trimming vegetation having differing characteristics.

SUMMARY OF THE INVENTION

The longstanding but heretofore unfulfilled need for a sidewalk edging device of increased versatility vis a vis the earlier devices is now provided in the form of a tractor drawn device that has means for applying different amounts of weights to the cutting blades as soil and vegetation conditions warrant. The lateral distance between the blades is adjustable in three different ways over a very wide range and the pitch of each blade is adjustable as well.

The novel apparatus includes a rectangular, rigid frame member that is disposed in a horizontal plane when the invention is in use.

The frame supports a pair of articulated arm members disposed in the same horizontal plane as the frame. Each arm member provides a mount for its associated cutting blade. Arm pivoting means are provided for swinging the arms in a horizontal plane so that the pitch of the cutting blades is adjustable.

Moreover, each cutting blade may be mounted at differing locations along the extent of its associated arm member as a first means whereby the lateral spacing between the blades can be varied. A second means for varying said distance includes spacer means attached to the individual axle housings which rotatably mount each cutting blade; the axle housings are grooved at laterally spaced intervals to provide a third means for adjusting the spacing between the blades.

One or more weight-receiving receptacles are fixedly secured to the frame above each cutting blade so that differing amounts of weight can be applied to the blades as needed. For example, a sidewalk that has been neglected for a year or more may require additional weights, even if the soil is soft, due to the thickness of vegetation. Additional weights are added to the weight-receiving containers when such a condition is encountered, and removed when such extra weights are not needed.

The primary object of this invention is to pioneer the art of adjustable weight sidewalk edgers.

Another object is to provide a sidewalk edging device that has improved means for adjusting the space between cutting blades and for changing the pitch of the cutting blades. The invention accordingly comprises the features of construction, combination of elements and arrangement of parts that will be exemplified in the descriptions set forth hereinafter and the scope of the invention will be set forth in the claims.

BRIEF DESCRIPTION OF THE DRAWINGS

FIG. 1 is a side elevational view of an embodiment that illustrates the inventive concept;

FIG. 2 is a front elevational view of said illustrative embodiment;

FIG. 3 is a sectional view taken along line 3-3 in FIG. 2;

FIG. 4 is a front elevational view of a cutting blade and its axle assembly;

FIG. 5 is a top plan view of said exemplary embodiment;

FIG. 6 is a detailed sectional view of said axle assembly;

FIG. 7 is a partial top plan view showing suggested means for adjusting the pitch of the cutting blade members;

FIG. 8 is a front elevational view showing one possible spacing of the cutting blade members;

FIG. 9 shows a second possible spacing thereof;

FIGS. 10-14 show further obtainable positions of the cutting blades.

Similar reference numerals refer to similar parts throughout the several views of the drawings.

DETAILED DESCRIPTION OF A PREFERRED EMBODIMENT

Referring first to FIG. 5, it will there be seen that an illustrative embodiment of the invention is designated by the reference numeral 10 as a whole.

Walkway trimmer 10 includes a rigid frame member 12 of rectilinear configuration; frame 12 is positioned substantially in a horizontal plane when the invention is in use. It includes front and back, transversely disposed frame members 14, 16 and longitudinally disposed, left and right frame members 18, 20, respectively.

An upstanding towing frame construction, generally denoted 22, is releasably engaged by a tractor, not shown, or other vehicle capable of towing the inventive apparatus. Frame 22 includes brace members 19, 21, 23 and 25. Draw bar members 26, 28 and chain 30 releasably engage said towing frame 22 in a conventional manner.

A pair of transversely disposed, left and right arm members 32, 34 are pivotally mounted for movement in a horizontal plane. In the illustrated embodiment, said pivotal movement occurs in the same plane of the frame member 12. However, the invention, it is believed, will work even if arm members 32, 34 are mounted for pivotal movement in a parallel horizontal plane as well.

In the illustrated embodiment, left and right frame members 18, 20 are suitably apertured or stated as at 33, 35 to receive arm members 32, 34, respectively.

A pair of parallel guide members 36, 38, best shown in FIG. 7, interconnect front and back frame members 14, 16 and provide the pivot points 32a, 34a for arm members 32, 34.

Front frame member 14 is also apertured and appropriately threaded as at 39 to screw-threadedly receive elongate screw member 40; said screw member 40 extends parallel to guide members 36, 38 and its distal free end is connected as at 42 to each arm member 32, 34.

Rotation of screw member 40 by means of crank 41 thus effects pivotal movement of arm members 32, 34. For example, advancing screw 40 effects pivoting of the inner ends of arm members 32, 34 in the direction of directional arrow 39 (FIG. 7), and pivoting of the outer ends of arm members 32, 34 in the direction of arrows 41.

Cutting blade members 44, 46 are rotatably mounted for rotation in a vertical plane about a horizontal axis of rotation 5, as indicated in FIG. 8.

Accordingly, as depicted in FIG. 7, cutting blade member 44 is swung along an arcuate path of travel from position A to position when arm member 32 pivots. Pivoting of arm member 34 effects a corresponding movement, or pitch, of cutting blade member 46.

As shown in FIG. 2, interconnecting or blade mounting members 48, 50 are releasably secured at their respective uppermost ends by bolt and plate assemblies 31, 37 to arm members 32, 34, and are also releasably secured at their respective lowermost ends to axle housing members 52, 54 by bracket members 47, 49 and U-bolts 47a, 49a.

Movement of arm members 32, 34 in a horizontal plane effects movement of the interconnecting along an arcuate path of travel members 48, 50 and said movement effects the aforementioned movement of cutting blade members 44, 46 as depicted in FIG. 7.

Such movement of the cutting blade members 44, 46 is advantageous because changing the pitch of the cutting members increases the cutting ability of device 10, i.e., different pitches of blade members 44, 46 may be effective as different soil and vegetation and walkway structures are encountered.

The lateral spacing between left and right cutting blade members 44, 46 may be changed in three different ways. Bolt and plate assemblies 31 or 37, or both, may be loosened to allow lateral displacement of each interconnecting member 48, 50 to any desired position along the available extent of arms 32, 34, respectively, as indicated by the double-headed directional arrows 56, 58 in FIG. 2. The assemblies 31, 37 are re-tightened when the desired distance between blades 44, 46 has been achieved.

The second way whereby the blade spacing may be changed involves the axle housing assemblies 52, 54.

As shown in FIG. 2, each axle housing assembly 52, 54 is a longitudinally bifurcated structure including upper and lower housing members as indicated by parting lines 52a, 54a. When placed in cooperative alignment with one another, the housing half portions form a generally cylindrical housing 52, 54 as aforesaid. Plural, laterally spaced groove members, collectively designated 52b and 54b are formed on the exterior of each housing 52, 54, respectively, to selectively receive U-bolt members 47a, 49a. In this manner, the lateral displacement of each cutting blade member 44, 46 can be adjusted by positioning said U-bolts in differing grooves, as shown in FIG. 14, for example.

As shown in FIG. 6, housing 52 and housing 54, not shown in FIG. 6, is axially, cylindrically bored as at 59 and suitably greased to rotatably receive a cylindrical member 60 that, in turn, is provided with a square, axial bore 61. Each cutting blade member 44, 46 is mounted on a square axle member 44a, 46a that is keyed into said square, axial bore 61. In this manner, as each cutting blade rotates in response to frame 12 being towed, square axle members 44a, 46a also rotate and cause cylinder members 60 to rotate in their respective cylindrical bore means 59.

Spacer members 64, 66 may be placed at any location along the extent of square axle members 44a, 46a, to thereby provide the third means for affecting the lateral positioning between cutting blade members 44, 46. Numerous suggestive positionings of said spacer members appear in FIGS. 8-14.

The novel means for adjusting the depth of the cut made by the cutting blade members 44, 46 includes receptacles 68, 70 (FIGS. 1 and 5) which are mounted atop frame member 12; one or more weight members of the type usable with barbells may be positioned within said receptacles 68, 70 to accomplish the desired depth adjustment, or they may be charged with differing amounts of differing materials such as stones, sand, water, etc. Thus, where the walkway to be trimmed has been recently trimmed and where the soil is comparatively soft, receptacle 68, 70 may be emptied of weight means and the desired trim can be effected with the only weight bearing down on each cutting blade 44, 46 being the inherent weight of apparatus 10.

Where the vegetation to be trimmed is more established, i.e., where greater amounts of time have elapsed between edgings, weight is added to the receptacles 68, 70

The size and number of receptacles 68, 70 may be increased as needed.

In this manner, a simple yet highly versatile means for adjusting the cutting depth is provided.

Spring member 72, shown in FIGS. 13 and 14, provide flexibility to ensure that the cutting block members 44, 46 continuously bear against the edges of the walkway 74, even when the walkway flares into a wider or narrower walkway.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus, towed by a vehicle, that trims vegetation growing over the edges of longitudinally extending walkways, comprising:
 a first rotatably mounted cutting blade member that trims vegetation along a first edge of a walkway;
 a second rotatably mounted cutting blade member, laterally spaced from said first cutting blade member, that trims vegetation along a second edge of a walkway;
 a frame member disposed in a generally horizontal plane;
 a first pivotally mounted, generally transversely and horizontally disposed arm member having an inner end, a medial portion and an outer end;
 a first generally vertically disposed interconnecting member depending from an outer end of said first arm member;
 said first cutting blade member being rotatably mounted to a lower end of said first interconnecting member;
 a second pivotally mounted, generally transversely and horizontally disposed arm member having an inner end, a medial portion, and an outer end;
 a second generally vertically disposed interconnecting member depending from an outer end of said second arm member;
 said second cutting blade member being rotatably mounted to a lower end of said second interconnecting member;
 pivoting means forming a part of said frame member for pivoting said first and second arm members in a generally horizontal plane so that their respective outer ends, and hence said respective first and second cutting blade members, follow an arcuate path of travel;
 said first and second cutting blade members being disposed in parallel, straightforward alignment when said respective arm members are in unpivoted positions transverse to the longitudinal extent of said walkway, and said first and second cutting blade members being disposed in a converging or diverging disposition relative to each other dependent upon the direction said outer ends of said arm members are swung by said pivoting means;
 whereby the angle between the cutting blade members and the respective walkway edges is adjustable.

2. The apparatus of claim 1, further comprising a cutting depth control means that includes a plurality of weighted members and at least one container means mounted to said frame member, said container means operable to receive and retain any preselected number of said weighted members.

3. The apparatus of claim 2, wherein said frame member is generally rectangular in configuration and includes parallel front and back frame members fixedly secured at their respective opposite ends to parallel left and right side frame members.

4. The apparatus of claim 3, wherein each of said left and right side frame members are slotted to receive therethrough the medial portion of an associated arm member.

5. The apparatus of claim 4, further comprising a pair of parallel rigid guide members disposed in interconnecting relation to said front and back side frame members, substantially mid-length thereof.

6. The apparatus of claim 5, wherein each of said arm members is pivotally connected near an inner end thereof to an associated guide member.

7. The apparatus of claim 6, wherein said pivoting means at least in part includes an elongate screw member that is screw-threadedly received through said front frame member, centrally thereof, said screw member extending parallel to said guide members, intermediate thereof, and said screw member having its distal end pivotally secured to each of said arm members so that advancing and retracting said screw member effects pivoting of said arm members in a generally horizontal plane, arcuate movement of said interconnecting members, and displacement of said cutting blade members.

8. The apparatus of claim 7, further comprising an axle assembly for each blade member, each said axle assembly including at least one spacer member so that each cutting blade member is selectively positionable at a plurality of positions along the extent of its associated axle assembly.

9. The apparatus of claim 8, further comprising towing means, said towing means being fixedly secured to said frame member and releasably secured to a vehicle whereby said apparatus may be towed by a vehicle.

10. A towable device that trims vegetation from the borders of a longitudinally extending walkway or roadway, comprising:
  a frame member;
  a pair of laterally spaced axle mounted cutting blade members that rotate when said frame member is towed;
  a cutting depth control means for selectively controlling the depth said cutting blade members penetrate said vegetation;
  said cutting depth control means including a pair of laterally spaced container members supported by said frame member, each of said container members adapted to receive at least one weight member;
  articulation means for swinging each cutting blade member along an arcuate path of travel;
  said articulation means including a pair of generally transversely disposed arm members oscillatable in a generally horizontal plane;
  said arm members supported by said frame member; and
  each cutting blade member being mounted to an associated blade mounting member that depends from an outer end of its associated arm member;
  whereby said cutting blade members are disposed along an arcuate path of travel when the outer ends of said arm members are displaced in a generally horizontal plane.

11. The device of claim 10, further comprising a lateral adjustment means for adjusting the lateral spacing between said cutting blade members.

12. The device of claim 11, wherein said lateral adjustment means includes an axle assembly means that is rotatably secured to a lower end of each of said blade mounting members, each of said axle assemblies including an axle member and housing therefor, said axle members being elongate and said lateral adjustment means including at least one spacer means carried by an axle member, said spacer means having a preselected length which determines the amount of lateral offset between a non-adjusted position of a cutting blade member and its laterally adjusted position.

13. A device that forms parallel, laterally spaced cuts in vegetation along a longitudinal path of travel, said device characterized by a pair of laterally spaced, rotatably mounted cutting blade members, the spacing between which is adjustable, further characterized by said blade members being simultaneously movable along an arcuate path of travel and further characterized by individual weight members that are added to or removed form said device to adjust the depth of penetration of said cuts.

14. The device of claim 13, wherein said device is further characterized by a frame member that is horizontally disposed when the device is in operation and by a pair of arm members mounted for oscillation ion the same plane as said frame member.

15. The device of claim 14, further characterized by a blade mounting member that depends in a vertical plane to each of said arm members and which is adjustable along a predetermined extent thereof to accomplish lateral adjustment between said cutting blade members, and further characterized by a blade member axle assembly associated with each cutting blade member, said axle assembly characterized by spacer members, the use of which further effects lateral adjustment of said cutting blade members.

* * * * *